United States Patent
Noh et al.

(10) Patent No.: US 11,722,586 B2
(45) Date of Patent: Aug. 8, 2023

(54) ASSEMBLY TYPE EDGE SYSTEM

(71) Applicant: SDPlex Co., Ltd., Seoul (KR)

(72) Inventors: Joohwan Noh, Seoul (KR); Sangjin Yun, Anyang-si (KR); Byung-hoon Kim, Hwaseong-si (KR)

(73) Assignee: SDPLEX CO, , LTD., Seoul (KR)

( * ) Notice: Subject to any disclaimer, the term of this patent is extended or adjusted under 35 U.S.C. 154(b) by 0 days.

(21) Appl. No.: 17/764,488

(22) PCT Filed: Oct. 22, 2021

(86) PCT No.: PCT/KR2021/014974
§ 371 (c)(1),
(2) Date: Mar. 28, 2022

(87) PCT Pub. No.: WO2022/086298
PCT Pub. Date: Apr. 28, 2022

(65) Prior Publication Data
US 2022/0368780 A1 Nov. 17, 2022

(30) Foreign Application Priority Data
Oct. 23, 2020 (KR) .......................... 10-2020-0138211

(51) Int. Cl.
*G06F 15/16* (2006.01)
*H04L 69/08* (2022.01)
(Continued)

(52) U.S. Cl.
CPC .............. *H04L 69/08* (2013.01); *H04L 67/34* (2013.01); *H04L 67/75* (2022.05); *H04L 69/18* (2013.01)

(58) Field of Classification Search
CPC ......... H04L 69/08; H04L 69/18; H04L 67/34; H04L 65/40
(Continued)

(56) References Cited

U.S. PATENT DOCUMENTS

2020/0007414 A1 1/2020 Smith et al.
2021/0075892 A1* 3/2021 Chun ..................... H04L 69/163

FOREIGN PATENT DOCUMENTS

| KR | 10-2004-0076857 A | 9/2004 |
|----|-------------------|--------|
| KR | 10-2015-0020080 A | 2/2015 |
| KR | 10-2020-0054372 A | 5/2020 |

OTHER PUBLICATIONS

Office Action dated Jun. 30, 2021 in Korean Application No. 10-2020-0138211.
(Continued)

*Primary Examiner* — Lan Dai T Truong
(74) *Attorney, Agent, or Firm* — Knobbe, Martens, Olson & Bear, LLP (57) ABSTRACT

This application relates to an assembly type edge system. In one aspect, the edge system includes M protocol modules connected to and interworked with the at least one interworking target device according to a specified interworking protocol, and a collection module configured to collect a collection data set of a specified collection data structure through at least one protocol module. The system may also include P processing modules configured to generate n ($1 \leq n \leq N$) pieces of data to be transmitted to a specified higher-level system, and S structuring modules configured to generate a transmission data set by structuring a data group including the n pieces of data. The system may also include T communication modules configured to apply a specified communication protocol to the transmission data set, and transmit the transmission data set to a specified higher-level system, and a control module configured to control one or more of the modules.

34 Claims, 3 Drawing Sheets

(51) Int. Cl.
*H04L 67/75* (2022.01)
*H04L 67/00* (2022.01)
*H04L 69/18* (2022.01)

(58) Field of Classification Search
USPC .......................................................... 709/230
See application file for complete search history.

(56) References Cited

OTHER PUBLICATIONS

Notice of Allowance dated Nov. 26, 2021 in Korean Application No. 10-2020-0138211.

* cited by examiner

ASSEMBLY TYPE EDGE SYSTEM

The present application is a U.S. national phase application under 35 U.S.C. § 371 of International Application No. PCT/KR2021/014974, filed on Oct. 22, 2021, which claims the benefit of Korean Patent Application No. 10-2020-0138211 filed on Oct. 23, 2020 in the Korean Intellectual Property Office, the entire disclosure of each of which is incorporated herein by reference.

TECHNICAL FIELD

The present disclosure relates to an edge system, and more particularly, to an assembly type edge system including M (M≥1) protocol modules that are connected to at least one interworking target device among D (D≥1) interworkable devices and interworked with the at least one interworking target device according to a specified interworking protocol, a collection module configured to collect a collection data set of a specified collection data structure through at least one protocol module among the M protocol modules, P (P≥1) processing modules configured to generate n (1≤n≤N) pieces of data to be transmitted to a specified higher-level system by performing at least one of converting, calculating, cleaning, and filtering on N (N≥1) pieces of data, which are included in the collection data set collected through the collection module, according to a specified rule, S (S≥1) structuring modules configured to generate a transmission data set by structuring a data group including the n pieces of data, which are generated through specified p (1≤p≤P) processing modules among the P processing modules, into a specified transmission data structure transmittable to a specified higher-level system, T (T≥1) communication modules configured to apply a specified communication protocol to the transmission data set, which is structured and generated through at least one structuring module, and transmit the transmission data set to a specified higher-level system through a communication network, and a control module configured to control such that the collection data set of the specified collection data structure is collected from specified m (1≤m≤M) protocol modules among the M protocol modules through the collection module, control such that the collection data set collected through the collection module is transmitted to the specified p processing modules among the P processing modules and processed according to the specified rule, control such that the n pieces of data processed through the p processing modules are transmitted to specified s (1≤s≤S) structuring modules among the S structuring modules and structured into the specified transmission data structure, and control such that the transmission data set structured through the s structuring modules is transmitted to specified t (1≤t≤T) communication modules among the T communication modules and transmitted to the specified higher-level system.

BACKGROUND ART

Unlike cloud computing in which all data generated in originating sites is transmitted to a centralized server and is processed through the centralized server, edge computing, in which at least some of processing data are processed in real time through a small number of servers distributed and provided at the originating sites, is being developed. When a large amount of data is generated at the originating site, the edge computing has an advantage of significantly reducing data processing time and reducing bandwidth usage of a communication network for communicating with a higher-level system by processing at least some of the processing data at the corresponding originating site.

However, in a conventional edge computing, it is necessary to develop and build an edge system, which is optimized for the corresponding originating site, in each originating site, and thus it takes a lot of time and cost to develop or build each edge system. Meanwhile, for some known originating sites, an edge system optimized for the corresponding originating sites or an edge system that may be optimized through slight customization has been developed and supplied, but when it is necessary to build a new edge system in an unknown or new originating site, it takes a lot of time and cost to develop or build an edge system optimized for the corresponding originating site.

DESCRIPTION OF EMBODIMENTS

Technical Problem

The present disclosure is directed to providing an edge system, and more particularly, an assembly type edge system including an assembly type edge system including M (M≥1) protocol modules that are connected to at least one interworking target device among D (D≥1) interworkable devices and interworked with the at least one interworking target device according to a specified interworking protocol, a collection module configured to collect a collection data set of a specified collection data structure through at least one protocol module among the M protocol modules, P (P≥1) processing modules configured to generate n (1≤n≤N) pieces of data to be transmitted to a specified higher-level system by performing at least one of converting, calculating, cleaning, and filtering on N (N≥1) pieces of data, which are included in the collection data set collected through the collection module, according to a specified rule, S (S≥1) structuring modules configured to generate a transmission data set by structuring a data group including the n pieces of data, which are generated through specified p (1≤p≤P) processing modules among the P processing modules, into a specified transmission data structure transmittable to a specified higher-level system, T (T≥1) communication modules configured to apply a specified communication protocol to the transmission data set, which is structured and generated through at least one structuring module, and transmit the transmission data set to a specified higher-level system through a communication network, and a control module configured to control such that the collection data set of the specified collection data structure is collected from specified m (1≤m≤M) protocol modules among the M protocol modules through the collection module, control such that the collection data set collected through the collection module is transmitted to the specified p processing modules among the P processing modules and processed according to the specified rule, control such that the n pieces of data processed through the p processing modules are transmitted to specified s (1≤s≤S) structuring modules among the S structuring modules and structured into the specified transmission data structure, and control such that the transmission data set structured through the s structuring modules is transmitted to specified t (1≤t≤T) communication modules among the T communication modules and transmitted to the specified higher-level system.

Solution to Problem

According to an assembly type edge system of the present disclosure, the edge system includes M (M≥1) protocol modules that are connected to at least one interworking target device among D (D≥1) interworkable devices and interworked with the at least one interworking target device according to a specified interworking protocol, a collection module configured to collect a collection data set of a specified collection data structure through at least one protocol module among the M protocol modules, P (P≥1) processing modules configured to generate n (1≤n≤N) pieces of data to be transmitted to a specified higher-level system by performing at least one of converting, calculating, cleaning, and filtering on N (N≥1) pieces of data, which are included in the collection data set collected through the collection module, according to a specified rule, S (S≥1) structuring modules configured to generate a transmission data set by structuring a data group including the n pieces of data, which are generated through specified p (1≤p≤P) processing modules among the P processing modules, into a specified transmission data structure transmittable to a specified higher-level system, T (T≥1) communication modules configured to apply a specified communication protocol to the transmission data set, which is structured and generated through at least one structuring module, and transmit the transmission data set to a specified higher-level system through a communication network, and a control module configured to control such that the collection data set of the specified collection data structure is collected from specified m (1≤m≤M) protocol modules among the M protocol modules through the collection module, control such that the collection data set collected through the collection module is transmitted to the specified p processing modules among the P processing modules and processed according to the specified rule, control such that the n pieces of data processed through the p processing modules are transmitted to specified s (1≤s≤S) structuring modules among the S structuring modules and structured into the specified transmission data structure, and control such that the transmission data set structured through the s structuring modules is transmitted to specified t (1≤t≤T) communication modules among the T communication modules and transmitted to the specified higher-level system.

In the assembly type edge system according to the present disclosure, the control module may include a function of activating or driving the m protocol modules to be currently used from among the M protocol modules.

In the assembly type edge system according to the present disclosure, the M protocol modules may include metadata for each interworkable device or is accessible to metadata for each interworkable device provided in a specified medium, and the m protocol modules may include a function of automatically setting a portion or all of the interworking protocol or collection data structure for interworking with the specified interworking target device on the basis of the metadata for each interworkable device.

In the assembly type edge system according to the present disclosure, the control module may include a script code for setting or modifying the interworking protocol for interworking between the specified m protocol modules and the specified interworking target device.

In the assembly type edge system according to the present disclosure, the control module may include a user interface for setting or modifying the interworking protocol for interworking between the specified m protocol modules and the specified interworking target device.

In the assembly type edge system according to the present disclosure, the control module may add or delete a protocol library related to the specified interworking protocol to or from a medium related to the protocol module, and add or delete the interworking protocol by updating content corresponding to the protocol library added or deleted to or from the medium into an environment setting file that is referenced by the control module or the protocol module.

In the assembly type edge system according to the present disclosure, the control module may include a script code for setting or modifying the collection data structure of a collection data set to be collected from the specified m protocol modules through the collection module.

In the assembly type edge system according to the present disclosure, the control module may include a user interface for setting or modifying the collection data structure of a collection data set to be collected from the M protocol modules specified through the collection module.

In the assembly type edge system according to the present disclosure, the control module may include a function of setting a parameter for collecting the collection data set from the specified m protocol modules through the collection module.

In the assembly type edge system according to the present disclosure, the parameter may include device interworking information for the protocol module to identify the specified interworking target device and interwork therewith according to the specified interworking protocol, a data point (DP) or data point group (DPG) for identifying a location or format of data to be transmitted to the collection module among data obtained by the protocol module from the specified interworking target device, and collection setting information for setting a communication method or data collection method between the protocol module and the collection module.

In the assembly type edge system according to the present disclosure, the m protocol modules may include functions of checking metadata of the interworking target device, authenticating validity of the parameter by using the metadata, and operating on the basis of the parameter when the validity of the parameter is authenticated.

In the assembly type edge system according to the present disclosure, wherein the collection data set may include a data set generated by including one or more of: N pieces of data obtained from the specified interworking target device through the specified interworking protocol; a timestamp; a DP or DPG identifier; and a device identifier for identifying the specified interworking target device corresponding to a source of the N pieces of data, into the specified collection data structure.

In the assembly type edge system according to the present disclosure, the N pieces of data may include sensing data obtained by digitizing a signal sensed through a sensor provided in the specified interworking target device according to a specified conversion rule.

In the assembly type edge system according to the present disclosure, the N pieces of data may include data obtained by converting the sensing data into specified units according to a specified conversion rule.

In the assembly type edge system according to the present disclosure, the control module may include a function of activating or driving the p processing modules to be currently used from among the P processing modules.

In the assembly type edge system according to the present disclosure, the control module may include a script code for setting or modifying a specified rule for generating the specified n pieces of data through the specified p processing modules.

In the assembly type edge system according to the present disclosure, the control module may include a user interface for setting or modifying a specified rule for generating the specified n pieces of data through the specified p processing modules.

In the assembly type edge system according to the present disclosure, the processing module may include a function of converting the N pieces of data included in the collection data set into data of specified units according to a specified conversion rule.

In the assembly type edge system according to the present disclosure, the processing module may include a function of calculating the N pieces of data included in the collection data set or the N pieces of data, which are converted into specified units according to the specified conversion rule, according to a specified calculation rule.

In the assembly type edge system according to the present disclosure, the processing module may include a function of cleaning the N pieces of data included in the collection data set or the N pieces of data, which are converted into specified units according to the specified conversion rule, according to a specified cleaning rule.

In the assembly type edge system according to the present disclosure, the processing module may include a function of filtering the N pieces of data included in the collection data set or the N pieces of data, which are converted into specified units according to the specified conversion rule, according to a specified filtering rule.

In the assembly type edge system according to the present disclosure, the control module may include a function of activating or driving the s structuring modules to be currently used from among the S structuring modules.

In the assembly type edge system according to the present disclosure, the control module may include a script code for setting or modifying a rule for grouping the data group or the transmission data structure, which is for structuring the data group, through the specified s structuring modules.

In the assembly type edge system according to the present disclosure, the control module may include a user interface for setting or modifying a rule for grouping the data group or the transmission data structure, which is for structuring the data group, through the specified s structuring modules.

In the assembly type edge system according to the present disclosure, the data group may include at least one among n pieces of data generated at a specified time point through a single processing module, n pieces of data generated at a specified time point by a plurality of processing modules by interworking with each other, a combination of the n pieces of data generated at the specified time point through the single processing module and at least some of other n pieces of data, a combination of n pieces of data for each processing module separately generated at a specified time point through each of the plurality of processing modules, a combination of n pieces of data for each time point generated in connection with a plurality of time points through the single processing module, a combination of n pieces of data for each processing module generated at a specified time point by the plurality of processing modules by interworking with each other, a combination of the n pieces of data for each processing module generated in connection with the specified time point through the plurality of processing modules and at least some of other n pieces of data, and a combination of the n pieces of data for each processing module separately generated at the specified time point through each of the plurality of processing modules and at least some of other n pieces of data.

In the assembly type edge system according to the present disclosure, the other n pieces of data may include at least one of n pieces of data generated at a different time point in connection with the time point at which the specified n pieces of data is generated through the single processing module or the plurality of processing modules, and n pieces of data generated at a specified reference time point or a specified set time point through a separate processing module other than the single processing module or the plurality of processing modules.

In the assembly type edge system according to the present disclosure, the control module may include a function of activating or driving the t communication modules to be currently used from among the T communication modules.

In the assembly type edge system according to the present disclosure, the T communication modules may include metadata for each higher-level system or may be accessible to metadata for each higher-level system included in a specified medium, and the t communication modules may include a function of automatically setting at least a portion or all of the communication protocol for communicating with the specified higher-level system on the basis of the metadata for each higher-level system.

In the assembly type edge system according to the present disclosure, the control module may include a script code for setting or modifying the communication protocol for communicating with a specified higher-level system through the specified t communication modules or for transmitting the transmission data, which is structured into the specified transmission data structure, to the specified higher-level system.

In the assembly type edge system according to the present disclosure, the control module may include a user interface for setting or modifying the communication protocol for communicating with a specified higher-level system through the specified t communication modules or for transmitting the transmission data, which is structured into the specified transmission data structure, to the specified higher-level system.

In the assembly type edge system according to the present disclosure, the control module may include an environment setting file that is referenced by at least one of the M protocol modules, the collection module, the P processing modules, the S structuring modules, and the T communication modules, and an editing program for editing the environment setting file.

In the assembly type edge system according to the present disclosure, the control module may include a control program for controlling at least one of the M protocol modules, the collection module, the P processing modules, the S structuring modules, and the T communication modules.

In the assembly type edge system according to the present disclosure, the control module may include a script code for setting or modifying a control code for controlling the specified interworking target device through the specified m protocol modules.

In the assembly type edge system according to the present disclosure, the control module may include a user interface for setting or modifying a control code for controlling the specified interworking target device through the specified m protocol modules.

Advantageous Effects of Disclosure

According to the present disclosure, an assembly type edge system can be easily built with low cost and minimum time by implementing an edge system including M (M≥1) protocol modules, a collection module, P (P≥1) processing modules, S (S≥1) structuring modules, and T (T≥1) communication modules, and then, assembling m (1≤m≤M)

protocol modules, the collection module, p (1≤p≤P) processing modules, s (1≤s≤S) structuring modules, and t (1≤t≤T) communication modules in a modular assembly manner in a process of building the edge system depending on an interworking target device to be interworked with the edge system, an interworking protocol for interworking with the interworking target device, and the application and purpose of the edge system.

MODE OF DISCLOSURE

Hereinafter, operation principles of exemplary embodiments of the present disclosure will be described in detail with reference to the accompanying drawings. However, the drawings illustrated below and the following description relate to one exemplary embodiment among various exemplary embodiments for effectively explaining features of the present disclosure. Therefore, the present disclosure is not limited to the following drawings and descriptions.

That is, embodiments described below correspond to exemplary embodiments having the form of a union, and it is obvious that an embodiment in which a specific element (or operation) is omitted from embodiments described below, an embodiment in which a function implemented in a specific element (or operation) is divided into specific elements (or operations), an embodiment in which functions implemented in two or more elements (or operation) are integrated into one element (or operation), or the like fall within the scope of the present disclosure although not separately mentioned in the following embodiments. Accordingly, it should be noted that various embodiments corresponding to subsets and complementary sets based on the following embodiments may be divisionally filed while retaining their parent's filing data.

Further, in the following description, when a detailed description of a relevant known function or configuration is determined to unnecessarily obscure the gist of the present disclosure, the detailed description will be omitted. In addition, terms used herein are defined in consideration of the functions of the present disclosure and may be changed depending on a user, the intent of an operator, or a custom. Accordingly, the terms should be defined on the basis of the following overall description of the present disclosure.

As a result, the technical spirit of the present disclosure is defined by the claims, and the following embodiments are intended only to explain the technical spirit of the present disclosure to those of ordinary skill in the art.

Figure 1:
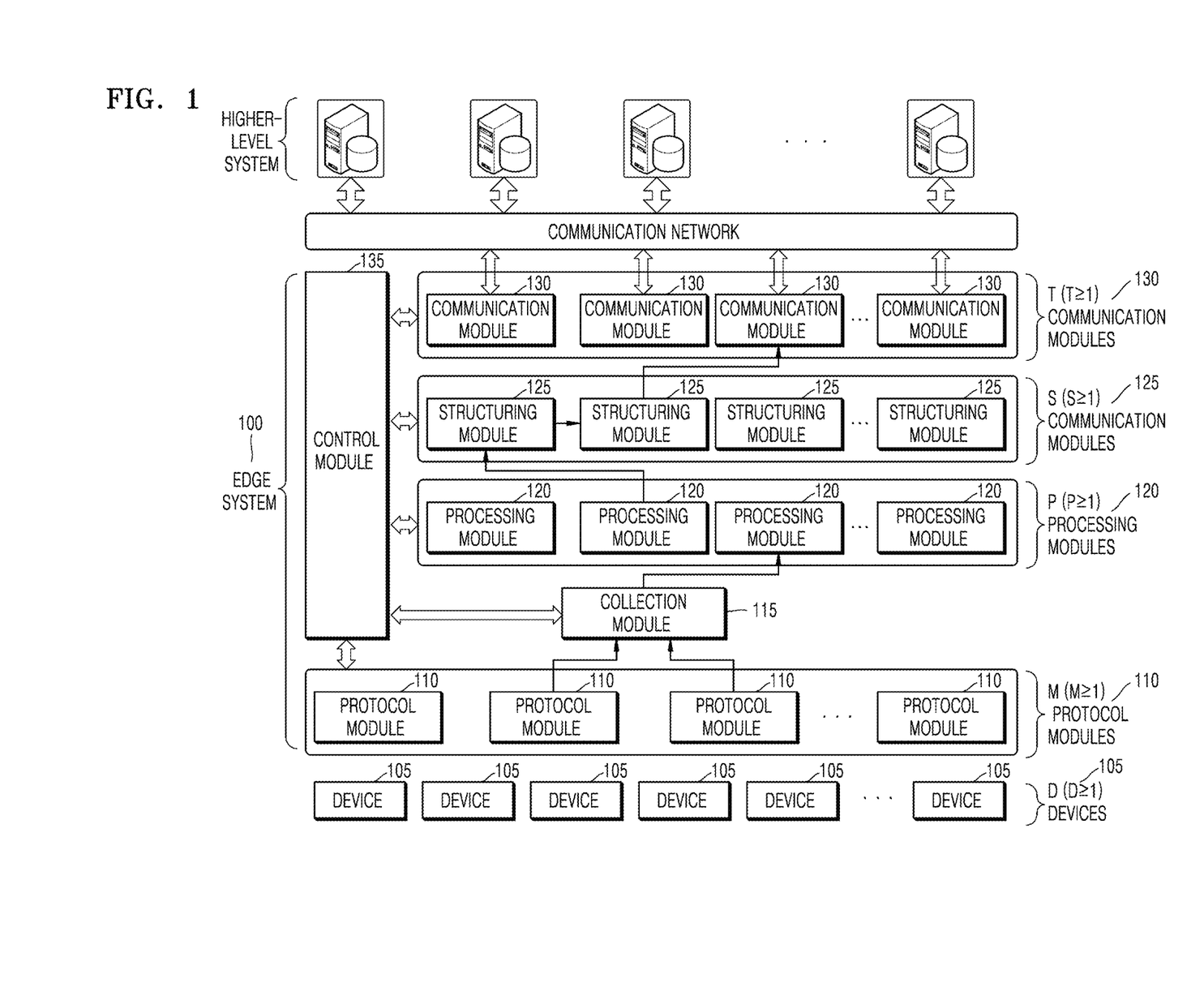
FIG. 1 shows a diagram illustrating a configuration of an assembly type edge system according to an embodiment of the present disclosure.

FIG. 1 shows a diagram illustrating a configuration of an assembly type edge system 100 according to an embodiment of the present disclosure.

In an embodiment, present FIG. 1 illustrates the assembly type edge system 100 obtained by implementing an edge system 100 including M (M≥1) protocol modules 110, a collection module 115, P (P≥1) processing modules 120, S (S≥1) structuring modules 125, and T (T≥1) communication modules 130, and then in a process of building the edge system 100, assembling m (1 mM) protocol modules 110, the collection module 115, p (1≤p≤P) processing modules 120, s (1≤s≤S) structuring modules 125, and t (1≤t≤T) communication modules 130 to build the edge system 100. Those of ordinary skill in the art will be able to estimate various embodiments (for example, an embodiment in which some components are omitted, subdivided, or combined) for the configuration of the assembly type edge system 100 by referring to and/or modifying present FIG. 1, but the present disclosure includes all the embodiments inferred above, and the technical features are not limited only to the embodiment illustrated in present FIG. 1.

Referring to FIG. 1, the assembly type edge system 100 of the present disclosure includes the M (M≥1) protocol modules 110 that are connected to at least one interworking target device 105 among D (D≥1) interworkable devices 105 and interworked with the at least one interworking target device 105 according to a specified interworking protocol, the collection module 115 configured to collect a collection data set of a specified collection data structure through the at least one protocol module 110 among the M protocol modules 110, the P (P≥1) processing modules 120 configured to generate n (1≤n≤N) pieces of data to be transmitted to a specified higher-level system by performing at least one of converting, calculating, cleaning, and filtering on N (N≥1) pieces of data, which are included in the collection data set collected through the collection module 115, according to a specified rule, the S (S≥1) structuring modules 125 configured to generate a transmission data set by structuring a data group, which includes the n pieces of data generated through specified p (1≤p≤P) processing modules 120 among the P processing modules 120, into a specified transmission data structure that is transmittable to a specified higher-level system, the T (T≥1) communication modules 130 configured to apply a specified communication protocol to the transmission data set, which is structured and generated through at least one structuring module, and transmit the transmission data set to a specified higher-level system through a communication network, and a control module 135 configured to control such that the collection data set of the specified collection data structure is collected from specified m (1≤m≤M) protocol modules 110 among the M protocol modules through the collection module 115, control such that the collection data set collected through the collection module 115 is transmitted to the specified p processing modules 120 among the P processing modules 120 and processed according to the specified rule, control such that the n pieces of data processed through the p processing modules 120 are transmitted to s (1≤s≤S) structuring modules 125 among the S structuring modules 125 to be structured into the specified transmission data structure, and control such that the transmission data set structured through the s structuring modules 125 is transmitted to specified t (1≤t≤T) communication modules 130 among the T communication modules 130 and transmitted to the specified higher-level system.

The protocol module 110 is a general term for components that may be physically and/or logically connected to at least one device 105 among the components of the edge system 100 and interwoked therewith according a specified interworking protocol. The protocol module 110 may include at least one of a hardware configuration for physical connection with at least one device 105, an electronic circuit configuration for logical connection, and a software configuration. The assembly type edge system 100 includes the M (M≥1) protocol modules 110 that are physically and/or logically connected to at least one interworking target device 105 among the D interworkable devices 105 and interworkable with the corresponding interworking target device 105 according to at least one specified interworking protocol corresponding to each interworking target device 105. The M protocol modules 110 may be distinguished by the interworking target device 105, a method of physically connecting the protocol module 110 to the interworking target device 105, a channel for physically connecting the protocol module 110 to the interworking target device 105, a method of logically connecting the protocol module 110 to the interworking target device 105, a channel for logically connecting the protocol module 110 to the interworking target device 105, a combination of the method of physically connecting the protocol module 110 to the interworking target device 105 and the method of logically connecting the protocol module 110 to the interworking target device 105, and/or, a combination of the channel for physically connecting the protocol module 110 to the interworking target device 105 and the channel for logically connecting the protocol module 110 to the interworking target device 105.

According to an embodiment of the present disclosure, the m (1≤m≤M) protocol modules 110, which currently are to be used in the edge system 100, are activated from among the M protocol modules 110 usable on the edge system 100, by the control module 135 or driven in the edge system 100 by the control module 135. For example, the control module 135 may provide a module setting interface for setting the m protocol modules 110, which are to be currently used, from among the M protocol modules 110 to a specified terminal and display the same thereon (but, when an app for displaying the module setting interface is installed in the terminal, the configuration of providing the module setting interface to the terminal may be omitted), and may receive module setting information for setting the m protocol modules 110 from among the M protocol modules 110 through the module setting interface displayed on the terminal. The control module 135 may update content corresponding to the module setting information in an environment setting file that is referenced by the control module 135 or the M protocol modules 110 in the edge system 100. In this case, the control module 135 may activate or drive the m protocol modules 110 with reference to the environment setting file. Alternatively, the M protocol modules 110 may refer to the environment setting file to activate or drive the m protocol modules 110.

According to an embodiment of the present disclosure, the M protocol modules 110 may include metadata for each interworkable device 105 or may be accessible to metadata for each interworkable device 105 provided in a specified medium on the edge system 100 or a specified medium related to each device 105. Meanwhile, when the m protocol modules 110 are activated or driven from among the M protocol modules 110 provided in the edge system 100, the m protocol modules 110 may be physically connected to any one of the interworkable devices 105 and identify the interworking target device 105, or when identification information of the interworking target device 105 is input (or selected) through a specified terminal, the m protocol modules 110 may refer to internal metadata ((or metadata of a specified medium) to check the metadata corresponding to the interworking target device 105, and may automatically set at least a portion or all of an interworking protocol or collection data structure for interworking with the interworking target device 105 by using the checked metadata.

According to an embodiment of the present disclosure, the control module 135 may include a script code for setting or modifying the interworking protocol for interworking between the specified m protocol modules 110 and the specified interworking target device 105. Preferably, the control module 135 may provide a script editing interface for editing the script code to the specified terminal and display the same thereon (but, when an app for displaying the script editing interface is installed in the terminal, the configuration of providing the script editing interface to the terminal may be omitted), and may set or modify the interworking protocol for interworking with the specified interworking target device 105 on the basis of the script code edited through the script editing interface displayed on the terminal. Meanwhile, when at least a portion of the interworking protocol for interworking with the specified interworking target device 105 is automatically set through the metadata, the control module 135 may set or modify the remaining portion of the interworking protocol for interworking with the interworking target device 105 through the script code edited through the script editing interface.

According to an embodiment of the present disclosure, the control module 135 may include a user interface for setting or modifying the interworking protocol for interworking between the specified m protocol modules 110 and the specified interworking target device 105. Preferably, the control module 135 may provide the user interface to the specified terminal and display the same thereon (but, when an app for displaying the user interface is installed in the terminal, the configuration of providing the user interface to the terminal may be omitted), and may set or modify the interworking protocol for interworking with the specified interworking target device 105 through the user interface displayed on the terminal. Meanwhile, when at least a portion of the interworking protocol for interworking with the specified interworking target device 105 is automatically set through the metadata, the control module 135 may set or modify the remaining portion of the interworking protocol for interworking with the interworking target device 105 through the user interface.

According to an embodiment of the present disclosure, the interworking protocol is a general term for protocols for interworking with the specified device 105, and may preferably include at least one among a Process Control (OPC) data access (DA) protocol, an OPC Unified Architecture (UA) protocol, an EtherNet/IP Industrial Protocol (EIP) protocol, a Modbus protocol, an S7 protocol, and an MTConnect protocol. The interworking protocol may further include various protocols other than the exemplified protocols, and the present disclosure is not limited by the type or specification of the interworking protocol.

According to an embodiment of the present disclosure, the control module 135 may add or delete a protocol library related to the specified interworking protocol to or from a medium related to the M protocol modules 110, and may add or delete various interworking protocols used by the M protocol modules 110 by updating content corresponding to the protocol library added or deleted to or from the medium into an environment setting file that is referenced by the control module 135 or the protocol module 110.

The collection module 115 may collect a collection data set of a specified collection data structure from the specified m protocol modules 110, and the control module 135 may control the collection module 115 to collect the collection data set of the specified collection data structure from the m protocol modules 110.

According to an embodiment of the present disclosure, the control module 135 may include a script code for setting or modifying the collection data structure of a collection data set to be collected from the specified m protocol modules 110 through the collection module 115. Preferably, the control module 135 may provide a script editing interface for editing the script code to the specified terminal and display the same thereon (but, when an app for displaying the script editing interface is installed in the terminal, the configuration of providing the script editing interface to the terminal may be omitted), and may set or modify the collection data structure of a collection data set to be collected from the specified m protocol modules 110 through the collection module 115 on the basis of the script code edited through the script editing interface displayed on the terminal. Meanwhile, when at least a portion of the collection data structure of a collection data set, which is to be collected from the specified m protocol modules 110 through the collection module 115, is automatically set through the protocol module 110 by using the metadata, the control module 135 may set or modify the remaining portion of the collection data structure of a collection data set, which is to be collected from the specified m protocol modules 110 through the collection module 115, through the script code that is edited through the script editing interface.

According to an embodiment of the present disclosure, the control module 135 may include a user interface for setting or modifying the collection data structure of a collection data set to be collected from the specified m protocol modules 110 through the collection module 115. Preferably, the control module 135 may provide the user interface to the specified terminal and display the same thereon (but, when an app for displaying the user interface is installed in the terminal, the configuration of providing the user interface to the terminal may be omitted), and may set or modify the collection data structure of a collection data set, which is to be collected from the specified m protocol modules 110 through the collection module 115, through the user interface displayed on the terminal. Meanwhile, when at least a portion of the collection data structure of a collection data set, which is to be collected from the specified m protocol modules 110 through the collection module 115, is automatically set through the protocol module 110 by using the metadata, the control module 135 may set or modify the remaining portion of the collection data structure of a collection data set, which is to be collected from the specified m protocol modules 110 through the collection module 115, through the user interface.

According to an embodiment of the present disclosure, when the collection data structure of a collection data set to be collected from the specified m protocol modules 110 through the collection module 115 is set or modified, the m protocol modules 110 generate a collection data set matched to the specified collection data structure using data obtained from the specified interworking target device 105 through the interworking protocol, and the collection module 115 may collect the collection data set matched to the collection data structure from the m protocol modules 110.

Meanwhile, the control module 135 may include a function of setting a parameter for collecting the collection data set from the specified m protocol modules 110 through the collection module 115. Preferably, the control module 135 may set the parameter to the m protocol modules 110, which generates the collection data set, and the collection module 115.

According to an embodiment of the present disclosure, the parameter may include at least one piece of information among interworking information about the device 105 for the protocol module 110 to identify the specified interworking target device 105 and interwork therewith according to the specified interworking protocol, a data point (DP) or data point group (DPG) for identifying the location or format of data to be transmitted to the collection module 115 among data obtained by the protocol module 110 from the specified interworking target device 105, and collection setting information for setting a communication method or data collection method between the protocol module 110 and the collection module 115.

According to an embodiment of the present disclosure, the m protocol modules 110 check metadata of the interworking target device 105 and authenticate the validity of the parameter using the checked metadata. When the validity of the parameter is authenticated through the metadata, the m protocol modules 110 may generate a collection data set matched to the specified collection data structure using data obtained from the specified interworking target device 105 on the basis of the parameter, and the collection module 115 may collect the collection data set from the m protocol modules 110.

According to an embodiment of the present disclosure, the collection data set may include a data set generated by including one or more among N pieces of data corresponding to the data to be transmitted to the collection module 115 among the data obtained by the specified protocol module 110 from the specified interworking target device 105 through the specified interworking protocol, a timestamp corresponding to a time at which the N pieces of data are obtained, a DP identifier or DPG identifier configured to identify a data location or format corresponding to the N pieces of data to be transmitted to the collection module 115 among the data obtained from the specified interworking target device 105 through the specified interworking protocol, and an identifier for the device 105 to identify the specified interworking target device 105 corresponding to a source of the N pieces of data, into the specified collection data structure.

Meanwhile, the N pieces of data included in the collection data set may include sensing data obtained by digitizing a signal sensed through a sensor provided in the specified interworking target device 105 according to a specified conversion rule (e.g., a signal conversion rule), and n pieces of data obtained by processing the N pieces of data through the processing module 120 may include data converted from the sensing data into specified units according to a specified conversion rule (e.g., a unit conversion rule).

According to an embodiment of the present disclosure, in the edge system 100, each of the protocol module 110, the processing module 120, the structuring module 125, and the communication module 130 may be implemented in plurality, whereas the collection module 115 may be provided in a singular or an integrated form. Accordingly, even when the number of at least one of the protocol module 110, the processing module 120, the structuring module 125, and the communication module 130 that are activated or driven in the assembly process of the edge system 100 increases, the edge system 100 may be assembled by clarifying the relationship between each module and interworking therebetween with the collection module 115 as the center.

The processing module 120 is a general term for components capable of generating the n pieces of data to be transmitted to a specified higher-level system by performing at least one of converting, calculating, cleaning, and filtering on the N pieces of data, which are included in the collection data set collected through the collection module 115, according to the specified rule. The processing module 120 may include at least one of an electronic circuit configuration and a software configuration for generating the n pieces of data using the N pieces of data included in the collection data set. The assembly type edge system 100 includes the P (P≥1) processing modules 120 capable of generating the n pieces of data by performing at least one of converting, calculating, cleaning, and filtering on the N pieces of data, which are included in the collection data set collected from the m protocol modules 110 through the collection module 115, according to the specified rule. The P processing modules 120 may be distinguished by a rule or method for processing the N pieces of data included in the collection data set that is collected from the m protocol modules 110 through the collection module 115.

According to an embodiment of the present disclosure, at least one processing module 120 of the P processing modules 120 may include a function of converting the N pieces of data included in the collection data set into data of specified units according to the specified conversion rule (e.g., a unit conversion rule). For example, when the N pieces of data included in the collection data set include sensing data obtained by digitizing a signal sensed through the sensor provided in the specified interworking target device 105 into an integer value according to a specified analog-to-digital converter (ADC) conversion rule, the processing module 120 may convert the sensing data in the form of the integer value into a unit corresponding to a real-world metric system by using the specified unit conversion rule. Alternatively, when the N pieces of data included in the collection data set include real number data generated (or converted) using a specific metric system, the processing module 120 may convert the data of the specific metric system and measure into data of a unit corresponding to another metric system by using the specified unit conversion rule.

According to an embodiment of the present disclosure, at least one processing module 120 of the P processing modules 120 may include a function of calculating the N pieces of data included in the collection data set or the N pieces of data, which are converted into specified units according to the specified conversion rule, according to a specified calculation rule. For example, the processing module 120 may perform the calculation by applying an arithmetic rule such as arithmetic calculation or numerical calculation to the N pieces of data included in the collection data set or the N pieces of data, which are converted into specified units according to the specified conversion rule, according to the specified calculation rule. Meanwhile, the calculation rule may include an arithmetic or equation form, and may be set through the script code or the user interface related to the processing module 120.

According to an embodiment of the present disclosure, at least one processing module 120 of the P processing modules 120 may include a function of cleaning the N pieces of data included in the collection data set or the N pieces of data, which are converted into specified units according to the specified conversion rule, according to a specified cleaning rule. For example, the processing module 120 may arrange the N pieces of data included in the collection data set or the N pieces of data, which are converted into specified units according to the specified conversion rule, according to a specified alignment rule and clean them. Alternatively, the processing module 120 may apply a specified range-based cleaning rule to the N pieces of data included in the collection data set or the N pieces of data, which are converted into specified units according to the specified conversion rule, and may clean the N pieces of data included in the collection data set or the N pieces of data, which are converted into specified units according to the specified conversion rule, by deleting the data outside a predetermined effective range (or critical range) or modifying the data in the effective range (or critical range).

According to an embodiment of the present disclosure, at least one processing module 120 of the P processing modules 120 may include a function of filtering the N pieces of data included in the collection data set or the N pieces of data, which are converted into specified units according to the specified conversion rule, according to a specified filtering rule. For example, the processing module 120 may apply a specified condition rule to the N pieces of data included in the collection data set or the N pieces of data, which are converted into specified units according to the specified conversion rule, and delete some pieces of data that match the condition rule, or vice versa, delete some pieces of data that do not match the specified condition rule.

According to an embodiment of the present disclosure, among the P processing modules 120 usable on the edge system 100, the p (1≤p≤P) processing modules 120, which are currently to be used in the edge system 100, are activated by the control module 135 or driven in the edge system 100 by the control module 135. For example, the control module 135 may provide a processing setting interface for setting the p processing modules 120, which are to be currently used, among the P processing modules 120 to the specified terminal and display the same thereon (but, when an app for displaying the processing setting interface is installed in the terminal, the configuration of providing the processing setting interface to the terminal may be omitted), and may receive processing setting information for setting the p processing modules 120 among the P processing modules 120 through the processing setting interface displayed on the terminal. The control module 135 may update content corresponding to the processing setting information in an environment setting file that is referenced by the control module 135 or the P processing modules 120 in the edge system 100. In this case, the control module 135 may activate or drive the p processing modules 120 with reference to the environment setting file. Alternatively, the P processing modules 120 may refer to the environment setting file to activate or drive the p processing modules 120.

According to an embodiment of the present disclosure, the control module 135 may include a script code for setting or modifying a specified rule for generating the specified n pieces of data through the specified p processing modules 120. Preferably, the control module 135 may provide a script editing interface for editing the script code to the specified terminal and display the same thereon (but, when an app for displaying the script editing interface is installed in the terminal, the configuration of providing the script editing interface to the terminal may be omitted), and may set or modify the specified rule for generating the specified n pieces of data through the specified p processing modules 120 on the basis of the script code edited through the script editing interface displayed on the terminal.

According to an embodiment of the present disclosure, the control module 135 may include a user interface for setting or modifying the specified rule for generating the specified n pieces of data through the specified p processing modules 120. Preferably, the control module 135 may provide the user interface to the specified terminal and display the same thereon (but, when an app for displaying the user interface is installed in the terminal, the configuration of providing the user interface to the terminal may be omitted), and may set or modify the specified rule, which is for generating the specified n pieces of data through the specified p processing modules 120, through the user interface displayed on the terminal.

According to an embodiment of the present disclosure, at least one processing module 120 of the P processing modules 120 may include a function of converting the N pieces of data included in the collection data set into data of specified units according to the specified conversion rule (e.g., a unit conversion rule). For example, when the N pieces of data included in the collection data set include sensing data obtained by digitizing a signal sensed through the sensor provided in the specified interworking target device 105 into an integer value according to the specified ADC conversion rule, the processing module 120 may convert the sensing data in the form of the integer value into a unit corresponding to a real-world metric system by using the specified unit conversion rule. Alternatively, when the N pieces of data included in the collection data set include real number data generated (or converted) using a specific metric system, the processing module 120 may convert the data of the specific metric system and measure into data of a unit corresponding to another metric system by using the specified unit conversion rule.

According to an embodiment of the present disclosure, at least one processing module 120 of the P processing modules 120 may include a function of calculating the N pieces of data included in the collection data set or the N pieces of data, which are converted into specified units according to the specified conversion rule, according to a specified calculation rule. For example, the processing module 120 may perform the calculation by applying an arithmetic rule such as arithmetic calculation or numerical calculation to the N pieces of data included in the collection data set or the N pieces of data, which are converted into specified units according to the specified conversion rule, according to the specified calculation rule. Meanwhile, the calculation rule may include an arithmetic or equation form, and may be set through the script code or the user interface related to the processing module 120.

According to an embodiment of the present disclosure, at least one processing module 120 of the P processing modules 120 may include a function of cleaning the N pieces of data included in the collection data set or the N pieces of data, which are converted into specified units according to the specified conversion rule, according to a specified cleaning rule. For example, the processing module 120 may arrange the N pieces of data included in the collection data set or the N pieces of data, which are converted into specified units according to the specified conversion rule, according to a specified alignment rule and clean them. Alternatively, the processing module 120 may apply a specified range-based cleaning rule to the N pieces of data included in the collection data set or the N pieces of data, which are converted into specified units according to the specified conversion rule, and may clean the N pieces of data included in the collection data set or the N pieces of data, which are converted into specified units according to the specified conversion rule, by deleting the data outside a predetermined effective range (or critical range) or modifying the data in the effective range (or critical range).

According to an embodiment of the present disclosure, at least one processing module 120 of the P processing modules 120 may include a function of filtering the N pieces of data included in the collection data set or the N pieces of data, which are converted into specified units according to the specified conversion rule, according to a specified filtering rule. For example, the processing module 120 may apply a specified condition rule to the N pieces of data included in the collection data set or the N pieces of data, which are converted into specified units according to the specified conversion rule, and delete some pieces of data that match the condition rule, or vice versa, delete some pieces of data that do not match the specified condition rule.

According to an embodiment of the present disclosure, when the plurality of processing modules 120 are included in the p processing modules 120, the control module 135 may combine the p processing modules 120 according to a predetermined order or a combination rule and control such that the N pieces of data included in one collection data set are sequentially processed to generate the n pieces of data.

The structuring module 125 is a general term for components capable of structuring a data group, which includes the n pieces of data generated through the specified p processing modules 120 among the P processing modules 120, into a specified transmission data structure transmittable to a specified higher-level system and generating a transmission data set. The structuring module 125 may include at least one of an electronic circuit configuration and a software configuration for generating the transmission data set by structuring the data group including the n pieces of data generated through the p processing modules 120 into the specified transmission data structure. The assembly type edge system 100 includes the S (S≥1) structuring modules 125 configured to generate the transmission data set by structuring the data group including the n pieces of data, which are generated through the specified p processing modules 120, into the specified transmission data structure transmittable to the specified higher-level system. The S structuring modules 125 may be distinguished by a rule or a method of structuring the data group including the n pieces of data through the p processing modules 120.

According to an embodiment of the present disclosure, among the S structuring modules 125 usable on the edge system 100, the s (1≤s≤S) structuring modules, which are currently to be used in the edge system 100, are activated by the control module 135 or driven in the edge system 100 by the control module 135. For example, the control module 135 may provide a structuring setting interface for setting the s structuring modules 125, which are to be currently used, among the S structuring modules 125 to the specified terminal and display the same thereon (but, when an app for displaying the structuring setting interface is installed in the terminal, the configuration of providing the structuring setting interface to the terminal may be omitted), and may receive structuring setting information for setting the s structuring modules 125 among the S structuring modules 125 through the structuring setting interface displayed on the terminal. The control module 135 may update content corresponding to the structuring setting information in an environment setting file that is referenced by the control module 135 or the S structuring modules 125 in the edge system 100. In this case, the control module 135 may activate or drive the s structuring modules 125 with reference to the environment setting file. Alternatively, the S structuring modules 125 may refer to the environment setting file to activate or drive the s structuring modules 125.

According to an embodiment of the present disclosure, the control module 135 may include a script code for setting or modifying a rule for grouping the data group or the transmission data structure, which is for structuring the data group, through the specified s structuring modules 125. Preferably, the control module 135 may provide a script editing interface for editing the script code to the specified terminal and display the same thereon (but, when an app for displaying the script editing interface is installed in the terminal, the configuration of providing the script editing interface to the terminal may be omitted), and may set or modify the specified rule for grouping the data group or the transmission data structure, which is for structuring the data group, through the specified s structuring modules 125 on the basis of the script code edited through the script editing interface displayed on the terminal.

According to an embodiment of the present disclosure, the control module 135 may include a user interface for setting or modifying the rule for grouping the data group or the transmission data structure, which is for structuring the data group, through the specified s structuring modules 125. Preferably, the control module 135 may provide the user interface to the specified terminal and display the same thereon (but, when an app for displaying the user interface is installed in the terminal, the configuration of providing the user interface to the terminal may be omitted), and may set or modify the rule for grouping the data group or the transmission data structure, which is for structuring the data group through the specified s structuring modules 125, through the user interface displayed on the terminal.

According to an embodiment of the present disclosure, the data group may include at least one among n pieces of data generated at a specified time point through the single processing module 120, n pieces of data generated at a specified time point by the plurality of processing modules 120 by interworking with each other, a combination of the n pieces of data generated at the specified time point through the single processing module 120 and at least some of other n pieces of data, a combination of n pieces of data for each processing module 120 separately generated at a specified time point through each of the plurality of processing modules 120, a combination of n pieces of data for each time point generated in connection with a plurality of time points through the single processing module 120, a combination of n pieces of data for each processing module 120 generated at a specified time point by the plurality of processing modules 120 by interworking with each other, a combination of the n pieces of data for each processing module 120 generated in connection with the specified time point through the plurality of processing modules 120 and at least some data of other n pieces of data, and a combination of the n pieces of data for each processing module 120 separately generated at the specified time point through each of the plurality of processing modules 120 and at least some of other n pieces of data. Meanwhile, the other n pieces of data may include at least one of n pieces of data generated at a different time point in connection with the time point at which the specified n pieces of data are generated through the single processing module 120 or the plurality of processing modules 120, and n pieces of data generated at a specified reference time point or a specified set time point through a separate processing module 120 other than the single processing module 120 or the plurality of processing modules 120.

According to an embodiment of the present disclosure, when a plurality of structuring modules 125 are included in the s structuring modules 125, the control module 135 may control to generate the transmission data set by combining the s structuring modules 125 according to a predetermined order or combination rule and sequentially structuring the n pieces of data processed through the p processing modules 120.

The communication module 130 is a general term for components capable of communicating according to a specified communication protocol by being communicatively connected to at least one higher-level system among the components of the edge system 100 through a specified communication network. The communication module 130 may include at least one of a hardware configuration for communication connection with at least one higher-level system through the specified communication network, and an electronic circuit configuration and a software configuration for the communication connection. The assembly type edge system 100 includes the T (T≥1) communication modules 130 configured to communicate with the specified higher-level system according to the specified communication protocol by being communicatively connected to the specified higher-level system through the specified communication network. The T communication modules 130 may be distinguished by a higher-level system, a method of communicating with the higher-level system, and/or a channel for communicatively connecting with the higher-level system.

According to an embodiment of the present disclosure, among the T communication modules 130 usable on the edge system 100, the t (1≤t≤T) communication modules 130, which are currently to be used in the edge system 100, are activated by the control module 135 or driven in the edge system 100 by the control module 135. For example, the control module 135 may provide a communication setting interface for setting the t communication modules 130, which are to be currently used, among the T communication modules 130 to the specified terminal and display the same thereon (but, when an app for displaying the communication setting interface is installed in the terminal, the configuration of providing the communication setting interface to the terminal may be omitted), and may receive communication setting information for setting the t communication modules 130 among the T communication modules 130 through the communication setting interface displayed on the terminal. The control module 135 may update content corresponding to the communication setting information in an environment setting file that is referenced by the control module 135 or the T communication modules 130 in the edge system 100. In this case, the control module 135 may activate or drive the T communication modules 130 with reference to the environment setting file. Alternatively, the T communication modules 130 may refer to the environment setting file to activate or drive the t communication modules 130.

According to an embodiment of the present disclosure, the T communication modules 130 may include metadata for each higher-level system or may be accessible to metadata for each higher-level system provided in a specified medium on the edge system 100 or a specified medium related to each higher-level system. When the t communication modules 130 are activated or driven from among the T communication modules 130 provided in the edge system 100, the t communication modules 130 may be communicatively connected with a higher-level system to identify the higher-level system, or when the t communication modules 130 receive an input (or selection) of identification information of a higher-level system through a specified terminal, the t communication modules 130 may check metadata corresponding to the higher-level system by referring to internal metadata (or metadata of a specified medium) and communicate with the higher-level system using the checked metadata and/or may automatically set at least a portion or all of a communication protocol for transmitting transmission data structured into a specified transmission data structure to the specified higher-level system.

According to an embodiment of the present disclosure, the control module 135 may include a script code for setting or modifying a communication protocol for communicating with the specified higher-level system through the specified t communication modules 130 or for transmitting the transmission data, which is structured into the specified transmission data structure, to the specified higher-level system. Preferably, the control module 135 may provide a script editing interface for editing the script code to the specified terminal and display the same thereon (but, when an app for displaying the script editing interface is installed in the terminal, the configuration of providing the script editing interface to the terminal may be omitted), and may set or modify the communication protocol for communicating with the specified higher-level system or transmitting the transmission data, which is structured into the specified transmission data structure, to the specified higher-level system on the basis of the script code edited through the script editing interface displayed on the terminal. Meanwhile, when at least a portion of the communication protocol for communicating with the specified higher-level system or for transmitting the transmission data, which is structured into the specified transmission data structure, to the specified higher-level system is automatically set through the metadata, the control module 135 may set or modify the remaining portion of the communication protocol through the script code edited through the script editing interface.

According to an embodiment of the present disclosure, the control module 135 may include a user interface for setting or modifying the communication protocol for communicating with the specified higher-level system through the specified t communication modules 130 or for transmitting the transmission data, which is structured into the specified transmission data structure, to the specified higher-level system. Preferably, the control module 135 may provide the user interface to the specified terminal and display the same thereon (but, when an app for displaying the user interface is installed in the terminal, the configuration of providing the user interface to the terminal may be omitted), and may set or modify the communication protocol for communicating with the specified higher-level system or transmitting the transmission data, which is structured into the specified transmission data structure, to the specified higher-level system through the user interface displayed on the terminal. Meanwhile, when at least a portion of the communication protocol for communicating with the specified higher-level system or for transmitting the transmission data, which is structured into the specified transmission data structure, to the specified higher-level system is automatically set through the metadata, the control module 135 may set or modify the remaining portion of the communication protocol through the user interface.

According to an embodiment of the present disclosure, the interworking protocol is a general term for protocols for interworking with the specified higher-level system, and may preferably include at least one among an OPC UA protocol, a database (DB) protocol, a Message Queuing Telemetry Transport (MQTT) protocol, an Advanced Message Queuing Protocol (AMQP) protocol, and a FILE protocol. The communication protocol may further include various protocols other than the exemplified protocols, and the present disclosure is not limited by the type or specification of the communication protocol.

According to an embodiment of the present disclosure, the control module 135 may add or delete a protocol library related to the specified communication protocol to or from a medium related to the specified higher-level system, and may add or delete various communication protocols used by the T communication modules 130 by updating content corresponding to the protocol library added or deleted to or from the medium into an environment setting file that is referenced by the control module 135 or the communication module 130.

The control module 135 controls to activate or drive the m protocol modules 110 to be currently used from among the M protocol modules 110. Meanwhile, the control module 135 controls the activated or driven m protocol modules 110 to be connected to the d interworking target devices 105 and to obtain data according to the specified interworking protocol, and simultaneously, controls the collection module 115 to collect the collection data set of the specified collection data structure from the m protocol modules 110.

The control module 135 controls such that the p processing modules 120 to be currently used are activated or driven from among the P processing modules 120, the s structuring modules 125 to be currently used are activated or driven from among the S structuring modules 125, and the t communication modules 130 to be currently used are activated or driven from among the T communication modules 130. Meanwhile, when a collection data set of a specified collection data structure is collected from the m protocol modules 110 through the collection module 115, the control module 135 transmits the collection data set collected through the collection module 115 to the specified p processing modules 120 among the P processing modules 120 and controls the p processing modules 120 to process the collection data set according to a specified rule. Then, the control module 135 transmits n pieces of data processed through the p processing modules 120 to the specified s structuring modules 125 among the S structuring modules 125 and controls the s structuring modules 125 to structure the n pieces of data into a specified transmission data structure. Then, the control module 135 transmits the transmission data set structured through the s structuring modules 125 to the specified t communication modules 130 among the T communication modules 130 and controls the t communication modules 130 to transmit the transmission data set to a specified higher-level system.

According to an embodiment of the present disclosure, the control module 135 includes an environment setting file that may be referenced by at least one of the M protocol modules 110, the collection module 115, the P processing modules 120, the S structuring modules 125, and the T communication modules 130, and may further include an editing program for editing the environment setting file or an analysis program for interpreting or applying the environment setting file.

According to another embodiment of the present disclosure, the control module 135 may include a control program for controlling at least one of the M protocol modules 110, the collection module 115, the P processing modules 120, the S structuring modules 125, and the T communication modules 130.

Meanwhile, the control module 135 may control the specified interworking target device 105 through the M protocol modules 110. Preferably, the interworking target device 105 may detect or generate a signal corresponding to the specified data through at least one among a control process performed by the control module 135, a control process performed through a separate control system, and a self-control process performed by the interworking target device 105, and the m protocol modules 110 may obtain data corresponding to the detected or generated signal from the interworking target device 105 according to a specified interworking protocol.

According to an embodiment of the present disclosure, the control module 135 may include metadata for each interworkable device 105 or may be accessible to metadata for each interworkable device 105 provided in a specified medium on the edge system 100 or a specified medium related to each device 105. Meanwhile, when the m protocol modules 110 are physically connected to any one interworking target device 105 among the interworkable devices 105 and identify the interworking target device 105 or receive (or select) identification information about the interworking target device 105 through the specified terminal, the control module 135 may check metadata corresponding to the interworking target device 105 by referring to internal metadata (or metadata of a specified medium) and may automatically set at least a portion or all of a control code for controlling the specified interworking target device 105 through the m protocol modules 110 by using the checked metadata.

According to an embodiment of the present disclosure, the control module 135 may include a script code for setting or modifying the control code for controlling the specified interworking target device 105 through the specified M protocol modules 110. Preferably, the control module 135 may provide a script editing interface for editing the script code to the specified terminal and display the same thereon (but, when an app for displaying the script editing interface is installed in the terminal, the configuration of providing the script editing interface to the terminal may be omitted), and may set or modify the control code, which is for controlling the specified interworking target device 105 through the specified M protocol modules 110, on the basis of the script code edited through the script editing interface displayed on the terminal. Meanwhile, when at least a portion of the interworking protocol for interworking with the specified interworking target device 105 is automatically set through the metadata, the control module 135 may set or modify the remaining portion of the control code for controlling the interworking target device 105 through the script code edited through the script editing interface.

According to an embodiment of the present disclosure, the control module 135 may include a user interface for setting or modifying the control code for controlling the specified interworking target device 105 through the specified M protocol modules 110. Preferably, the control module 135 may provide the user interface to the specified terminal and display the same thereon (but, when an app for displaying the user interface is installed in the terminal, the configuration of providing the user interface to the terminal may be omitted), and may set or modify the control code, which is for controlling the specified interworking target device 105 through the specified M protocol modules 110, through the user interface displayed on the terminal. Meanwhile, when at least a portion of the interworking protocol for interworking with the specified interworking target device 105 is automatically set through the metadata, the control module 135 may set or modify the remaining portion of the control code for controlling the interworking target device 105 through the user interface.

Figure 2:
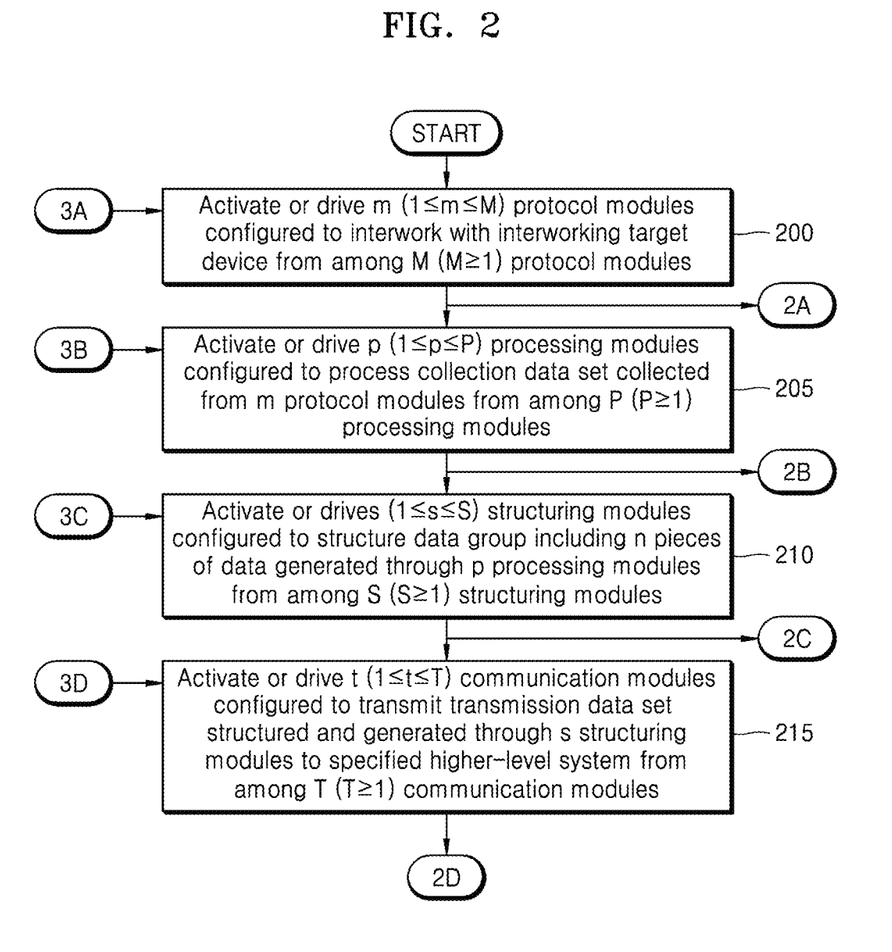
FIG. 2 shows a diagram illustrating a process of assembling the assembly edge system 100 according to an embodiment of the present disclosure.

FIG. 2 illustrates a process of assembling an edge system 100 according to an embodiment of the present disclosure.

In an embodiment, FIG. 2 illustrates a process of assembling the edge system 100 by activating the m protocol modules 110, the p processing modules 120, the s structuring modules 125, and the t communication modules 130 with the collection module 115 as the center, and those of ordinary skill in the art will be able to estimate various embodiments (for example, an embodiment in which some operations are omitted, subdivided, or combined) for the method by referring to and/or modifying present FIG. 2, but the present disclosure includes all the embodiments inferred above, and the technical features are not limited only to the embodiment illustrated in present FIG. 2.

Referring to FIG. 2, the control module 135 activates or drives the interworking target device 105 currently to be interworked and/or the m protocol modules 110, which is to be currently used from among the M protocol modules 110 included in the edge system 100, according to a specified rule on the basis of an interworking protocol for interworking with the interworking target device 105 (200).

Meanwhile, the control module 135 activates or drives the p processing modules 120 to be currently used from among the P processing modules 120 included in the edge system 100 according to one or more rules for converting, calculating, cleaning, or filtering N pieces of data included in a collection data set collected from the m protocol modules 110 (205).

Meanwhile, the control module 135 activates or drives the s structuring modules 125 to be currently used from among the S structuring modules 125 provided in the edge system 100 according to one or more rules for structuring a data group including the N pieces of data generated through the p processing modules 120 into a specified transmission data structure (210).

Meanwhile, the control module 135 activates or drives the t communication modules 130 to be currently used from among the T communication modules 130 included in the edge system 100 according to a specified rule on the basis of a higher-level system to which the transmission data generated through the s structuring modules 125 is to be transmitted and/or a communication protocol for communicating with the higher-level system (215).

Figure 3:
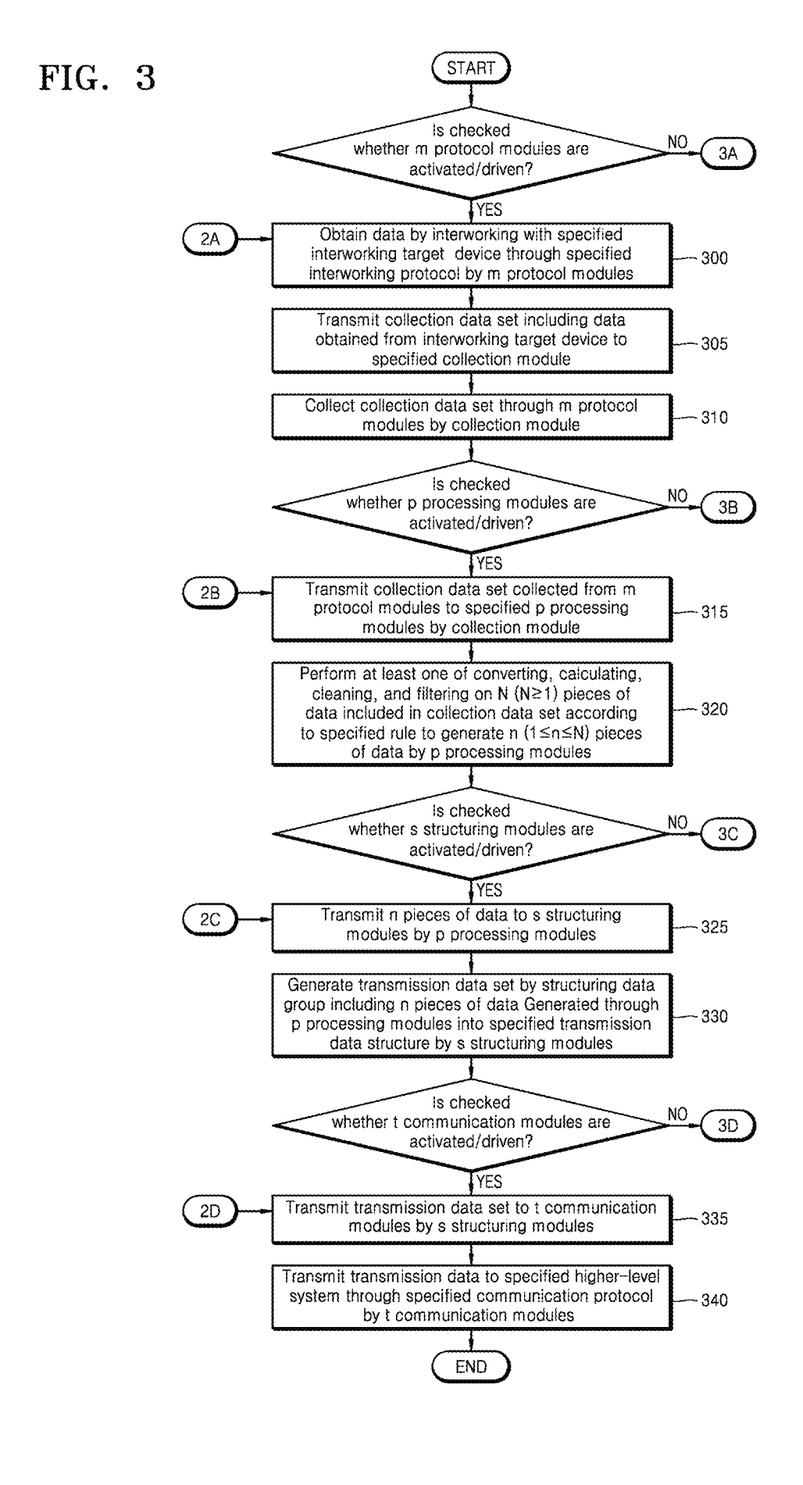
FIG. 3 shows a diagram illustrating operation processes of the assembly type edge system according to an embodiment of the present disclosure.

FIG. 3 shows a diagram illustrating operation processes of the assembly type edge system 100 according to an embodiment of the present disclosure.

In an embodiment, FIG. 3 illustrates processes of collecting a collection data set including data obtained from one or more specified interworking target device 105, performing at least one of converting, calculating, cleaning, and filtering on N pieces of data included in the collection data set to generate n pieces of data, structuring a data group including the generated n pieces of data into a specified transmission data structure to generate a transmission data set, and then transmitting the transmission data set to a specified higher-level system through a communication network, by the assembly type edge system 100, and those of ordinary skill in the art will be able to estimate various embodiments (for example, an embodiment in which some processes are omitted, subdivided, or combined) for the processes by referring to and/or modifying present FIG. 3, but the present disclosure includes all the embodiments inferred above, and the technical features are not limited only to the embodiment illustrated in present FIG. 3.

Referring to FIG. 3, when the m protocol modules 110 to be currently used are activated or driven from among the M protocol modules 110 provided in the edge system 100, the activated or driven m protocol modules 110 obtain data by interworking with the specified interworking target device 105 through a specified interworking protocol (300), configure a collection data set including the data obtained from the interworking target device 105, and transmit the collection data set to the specified collection module 115 (305), and the collection module 115 collects the collection data set through the m protocol modules 110 (310).

Meanwhile, when the p processing modules 120 to be currently used are activated or driven from among the P processing modules 120 provided in the edge system 100, the collection module 115 transmits the collection data set collected from the m protocol modules 110 to the activated or driven p processing modules 120 (315), and the p processing modules 120 performs at least one of converting, calculating, cleaning, and filtering on the N pieces of data included in the collection data set according to a specified rule to generate the n pieces of data (320).

Meanwhile, when the s structuring modules 125 to be currently used are activated or driven from among the S structuring modules 125 provided in the edge system 100, the p processing modules 120 transmit the n pieces of data to the s structuring modules 125 (325), and the s structuring modules 125 generate a transmission data set by structuring the data group including the n pieces of data generated through the p processing modules 120 into a specified transmission data structure (330).

Meanwhile, when t communication modules 130 to be currently used are activated or driven from among the T communication modules 130 provided in the edge system 100, the s structuring modules 125 transmit the transmission data set to the t communication modules 130 (335), and the t communication modules 130 transmit the transmission data to a specified higher-level system through a specified communication protocol (340).

The invention claimed is:

1. An edge system comprising:
   M ($\geq 1$) protocol modules that are connected to at least one interworking target device among D (D$\geq$1) interworkable devices and interworked with the at least one interworking target device according to a specified interworking protocol, wherein the protocol module includes an electronic circuit;
   P (P$\geq$1) processing modules to receive a collect data set of a specified collection data structure acquired through at least one protocol module among the M protocol module and to generate n (1$\leq$n$\leq$N) pieces of data to be transmitted to a specified higher-level system by performing at least one of converting, calculating, cleaning, and filtering on N (N$\geq$1) pieces of data, which are included in the collection data set, according to a specified rule;
   S (S$\geq$1) structuring modules to generate a transmission data set by structuring a data group including the n pieces of data, which are generated through specified p (1$\leq$p$\leq$P) processing modules among the P processing modules, into a specified transmission data structure transmittable to a specified higher-level system;
   T (T$\geq$1) communication modules to apply a specified communication protocol to the transmission data set, which is structured and generated through at least one structuring module, and transmit the transmission data set to a specified higher-level system through a communication network; and
   a control module to control the M protocol modules, the P processing modules, the S structuring modules, and the T communication modules such that:
   the collection data set of the specified collection data structure is collected from specified m (1$\leq$m$\leq$M) protocol modules among the M protocol modules,
   the collection data set is transmitted to the specified p processing modules among the P processing modules and processed according to the specified rule,
   the n pieces of data processed through the specified p processing modules are transmitted to specified s (1$\leq$s$\leq$S) structuring modules among the S structuring modules and structured into the specified transmission data structure, and
   the transmission data set structured through the specified s structuring modules is transmitted to specified t (1$\leq$t$\leq$T) communication modules among the T communication modules and transmitted to the specified higher-level system.

2. The edge system of claim 1, wherein the control module is to activate or drive the specified m protocol modules to be currently used from among the M protocol modules.

3. The edge system of claim 1, wherein:
   the M protocol modules include metadata for each interworkable device or is accessible to metadata for each interworkable device provided in a specified medium, and
   the specified m protocol modules are to automatically set a portion or all of the specified interworking protocol or collection data structure for interworking with the interworking target device based on the metadata for each interworkable device.

4. The edge system of claim 1, wherein the control module is to set or modify the specified interworking protocol for interworking between the specified m protocol modules and the interworking target device.

5. The edge system of claim 1, wherein the control module is to set or modify the specified interworking protocol for interworking between the specified m protocol modules and the interworking target device.

6. The edge system of claim 1, wherein the control module is to add or delete a protocol library related to the specified interworking protocol to or from a medium related to the protocol module, and add or delete the specified interworking protocol by updating content corresponding to the protocol library added or deleted to or from the medium into an environment setting file that is referenced by the control module or the protocol module.

7. The edge system of claim 1, wherein the control module is to set or modify the specified collection data structure of a collection data set to be collected from the specified m protocol modules.

8. The edge system of claim 1, wherein the control module is to set or modify the specified collection data structure of a collection data set to be collected from the specified m protocol modules.

9. The edge system of claim 1, wherein the control module is to set a parameter for collecting the collection data set from the specified m protocol modules.

10. The edge system of claim 9, wherein the parameter includes:
    device interworking information for the protocol module to identify the interworking target device and interwork therewith according to the specified interworking protocol,
    a data point (DP) or data point group (DPG) configured to identify a location or format of data to be collected among data obtained by the protocol module from the specified interworking target device, and
    collection setting information configured to set a communication method or data collection method.

11. The edge system of claim 9, wherein the specified m protocol modules are to check metadata of the interworking target device, authenticating validity of the parameter by using the metadata, and operating based on the parameter when the validity of the parameter is authenticated.

12. The edge system of claim 1, wherein the collection data set includes a data set generated by including one or more of:
- N pieces of data obtained from the interworking target device through the specified interworking protocol;
- a timestamp;
- a data point (DP) identifier or a data point group (DPG) identifier; or
- a device identifier configured to identify the interworking target device corresponding to a source of the N pieces of data, into the specified collection data structure.

13. The edge system of claim 1, wherein the N pieces of data include sensing data obtained by digitizing a signal sensed through a sensor provided in the interworking target device according to a specified conversion rule.

14. The edge system of claim 13, wherein the N pieces of data include data obtained by converting the sensing data into specified units according to a specified conversion rule.

15. The edge system of claim 1, wherein the control module is to activate or drive the specified p processing modules to be currently used from among the P processing modules.

16. The edge system of claim 1, wherein the control module is to set or modify a specified rule for generating the n pieces of data through the specified p processing modules.

17. The edge system of claim 1, wherein the control module is to set or modify a specified rule for generating the n pieces of data through the specified p processing modules.

18. The edge system of claim 1 wherein the P processing modules are to convert N pieces of data included in the collection data set into data of specified units according to a specified conversion rule.

19. The edge system of claim 18, wherein the P processing modules are to calculate the N pieces of data included in the collection data set or the N pieces of data, which are converted into specified units according to the specified conversion rule, according to a specified calculation rule.

20. The edge system of claim 18, wherein the P processing modules are to clean the N pieces of data included in the collection data set or the N pieces of data, which are converted into specified units according to the specified conversion rule, according to a specified cleaning rule.

21. The edge system of claim 18, wherein the P processing modules are to filter the N pieces of data included in the collection data set or the N pieces of data, which are converted into specified units according to the specified conversion rule, according to a specified filtering rule.

22. The edge system of claim 1, wherein the control module is to activate or drive the specified s structuring modules to be currently used from among the S structuring modules.

23. The edge system of claim 1, wherein the control module is to set or modify a rule for grouping the data group or the specified transmission data structure, which is for structuring the data group, through the specified s structuring modules.

24. The edge system of claim 1, wherein the control module is to set or modify a rule for grouping the data group or the specified transmission data structure, which is for structuring the data group, through the specified s structuring modules.

25. The edge system of claim 1, wherein the data group includes at least one of:
- n pieces of data generated at a specified time point through a single processing module;
- n pieces of data generated at a specified time point by a plurality of processing modules by interworking with each other;
- a combination of the n pieces of data generated at the specified time point through the single processing module and at least some of other n pieces of data;
- a combination of n pieces of data for each processing module separately generated at a specified time point through each of the plurality of processing modules;
- a combination of n pieces of data for each time point generated in connection with a plurality of time points through the single processing module;
- a combination of n pieces of data for each processing module generated at a specified time point by the plurality of processing modules by interworking with each other;
- a combination of the n pieces of data for each processing module generated in connection with the specified time point through the plurality of processing modules and at least some of other n pieces of data; or
- a combination of the n pieces of data for each processing module separately generated at the specified time point through each of the plurality of processing modules and at least some of other n pieces of data.

26. The edge system of claim 25, wherein the other n pieces of data include at least one of:
- n pieces of data generated at a different time point in connection with the time point at which the n pieces of data are generated through the single processing module or the plurality of processing modules, or
- n pieces of data generated at a specified reference time point or a specified set time point through a separate processing module other than the single processing module or the plurality of processing modules.

27. The edge system of claim 1, wherein the control module is to activate or drive the specified t communication modules to be currently used from among the T communication modules.

28. The edge system of claim 1, wherein the T communication modules include metadata for each higher-level system or are accessible to metadata for each higher-level system included in a specified medium, and wherein the specified t communication modules are to automatically set at least a portion or all of the specified communication protocol for communicating with the specified higher-level system based on the metadata for each higher-level system.

29. The edge system of claim 1, wherein the control module is to set or modify the specified communication protocol for communicating with a specified higher-level system through the specified t communication modules or for transmitting the transmission data set, which is structured into the specified transmission data structure, to the specified higher-level system.

30. The edge system of claim 1, wherein the control module is to set or modify the communication protocol for communicating with a specified higher-level system through the specified t communication modules or for transmitting the transmission data, which is structured into the specified transmission data structure, to the specified higher-level system.

31. The edge system of claim 1, wherein the control module includes an environment setting file that is referenced by at least one of the M protocol modules, the P processing modules, the S structuring modules, and the T communication modules, and an editing program for editing the environment setting file.

32. The edge system of claim 1, wherein the control module is to control at least one of the M protocol modules, the P processing modules, the S structuring modules, and the T communication modules.

33. The edge system of claim 1, wherein the control module is to set or modify a control code for controlling the interworking target device through the specified m protocol modules.

34. The edge system of claim 1, wherein the control module is to set or modify a control code for controlling the interworking target device through the specified m protocol modules.

\* \* \* \* \*